Jan. 11, 1972 V. D. LILIENSTERN Re. 27,267

RETRACTABLE HAIR DOLL

Original Filed March 27, 1967

INVENTOR

VERA D. LILIENSTERN,

BY Hall & Houghton

ATTORNEY

United States Patent Office

Re. 27,267
Reissued Jan. 11, 1972

27,267
RETRACTABLE HAIR DOLL

Vera D. Lilienstern, Purchase, N.Y., assignor to Mattel, Inc., Hawthorne, Calif.

Original No. 3,477,170, dated Nov. 11, 1969, Ser. No. 626,096, Mar. 27, 1967. Application for reissue June 16, 1970, Ser. No. 46,842
Int. Cl. A63h *11/00*
U.S. Cl. 46—135 16 Claims

Matter enclosed in heavy brackets [ ] appears in the original patent but forms no part of this reissue specification; matter printed in italics indicates the additions made by reissue.

ABSTRACT OF THE DISCLOSURE

A doll or the like of the class having a hollow head and body provided with a lock of hair arranged in protruding relation through an opening in the head, is provided with weight or spring power means within the body for exerting force to retract the lock of hair inwardly through the opening, and with releasable means for resisting retraction of the lock of hair through the opening.

Background of the invention

Field of the invention.—The field to which this invention relates is that of hair for figure toys (class 46–172).

Description of the prior arts.—My prior Patent No. 2,537,536 dated Jan. 9, 1951, discloses a doll of the class described having a withdrawable lock of hair stored in its head. Beebe et al. Patent No. 3,162,976 provided in such a doll a manually operable spindle protruding from the body of the doll and manually rotatable to retract the lock of hair.

Summary of invention

The present invention avoids the disadvantages of protuberances extending from the body of the doll and of complicated and expensive parts. It provides such a doll with weight or spring power means for applying retracting force to the lock of hair in combination with means for resisting such retraction. In particular embodiments it provides advantageous constructions of such means having additional cooperating functions, Particular objects and advantages of the invention will be apparent from the illustrative embodiments hereinafter described.

Brief description of the drawings

In the accompanying drawings of such illustrative embodiments.

In the drawings reference numerals having the same tens and units digits designate similar parts, the several embodiments being distinguished by the use of different hundreds digits therein.

Description of the preferred embodiments

Figure 1:
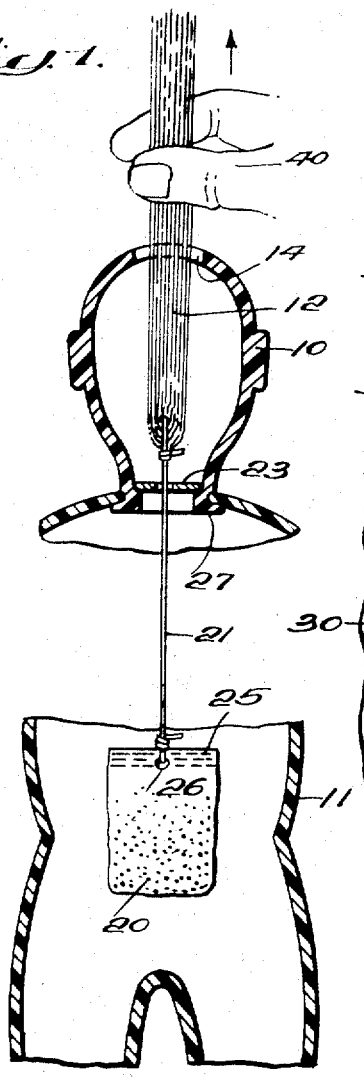
FIG. 1 is a more or less diagrammatic vertical section through a doll comprising one embodiment of the invention, with portions omitted for clarity and compactness.
Figure 2:
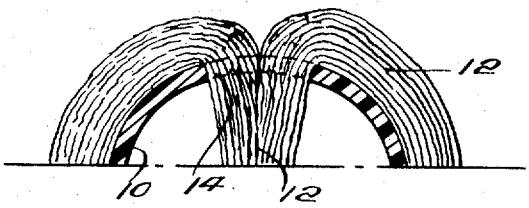
FIG. 2 is a detail of a portion of FIG. 1 in an altered position of cooperation.
Figure 3:
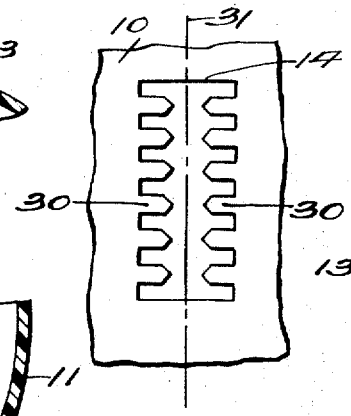
FIG. 3 is a plan view of the portion illustrated in FIG. 2 with the hair removed.

The embodiment shown in FIGS. 1–3, comprises a doll or a like figure having a hollow head 10 and a hollow body 11, with a lock of hair 12 arranged in protruding relation through an opening 14 in the head. Other hair (not shown) may be arranged on the head in areas not occupied by the opening, in any suitable manner, as is well known to those skilled in the art.

The doll comprises means for varying the length of the protruding portion of the hair 12 and in this embodiment such means comprises stored power means 20–21 within the figure for automatically exerting force to retract the lock of hair 12 inwardly through the opening 14 and retaining means 30 located at the opening for releasably engaging with said lock of hair for resisting retraction thereof by the force of said power means.

The stored power means 20–21 in this embodiment is in the form of a gravity powered weight 20 connected to the lock of hair 12 by a cord or wire 21, and progressively movable within the figure 11 between two extreme positions. In the first of these positions the strand of hair 12 is retracted to the maximum extent (limited by abutment of the hair or of a loop of the wire 21 connected thereto against a cardboard or plastic washer or stop 23 which is entered through the opening 14 in assembling the lock, and rests on the neck portion of the head, in the form shown). In the second of these positions the strand of hair is extended to the maximum extent (limited as the hair is pulled outwardly, as illustrated at 40 in FIG. 1, by the engagement of a second abutment, herein the top edge of the bag of sand employed as an inexpensive weight and preferably heat sealed at its top as shown at 25 with an eyelet 26 in its heat sealed portion, with the abutment provided by the structure surrounding the neck opening 27 at the junction of the head 10 and body 11).

The abutment means thus provided at 23 and 27 locate the weight 20 for movement only inside the body of the figure, thereby preventing it from entering the head. Thus the hair is provided with stop means 23 dimensioned to not allow it to pass through the opening from the head into the body, and the power means is confined within the body, whereby tangling of the hair with the power means is avoided. To prevent the hair 12 from becoming entangled with movable eye support or other mechanism housed in the head 10, suitable partitions or barriers (not shown) are employed as illustrated in my prior patent No. 2,537,536, but such partitions form no part of the present invention.

The retaining means 30 for engaging the lock of hair to resist its retraction by the gravity powered means 20, in this embodiment comprises a pair of comb-like toothed members provided at opposite edges of the opening 14, as by molding the same thereat when the head is of plastic construction as shown. By gathering the hair in the hand as indicated at 40, and pulling upwardly, the hair will be released from the comb-like teeth, and may be raised and lowered as a strand narrowed by guiding between the fingers of the other hand, to adjust the hair to the desired length under the gravity power operation of the weight 20, at which point the lock of hair may be moved laterally, or may be divided into two sections moved toward opposite sides of the opening 14, to engage the teeth as best indicated in FIG. 2. When the two portions of hair are engaged as then shown and laid down upon the head, the effect is as though the hair had been parted along the longitudinal axis of the elongated opening indicated generally at 31, in FIG. 3.

Figure 4:
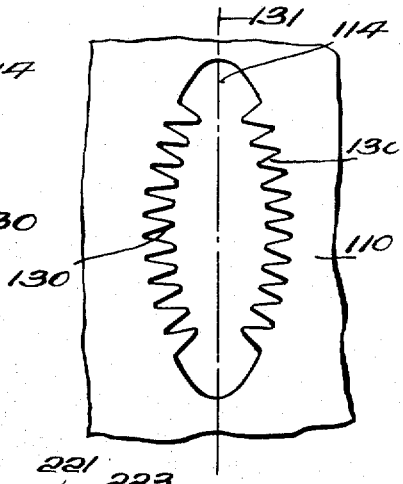
FIG. 4 is a plan view of an alternative embodiment of said portion.

In a second embodiment of the retaining means, illustrated in FIG. 4, the arrangement is generally the same as that of FIGS. 1–3, but the elongated opening 114 in the head 110 is made oval or contracted at its ends, and the teeth 130 are more rounded. As before engagement of a portion of the lock of hair in each side of the elongated opening can simulate a parting of the hair as at 131.

Figure 5:
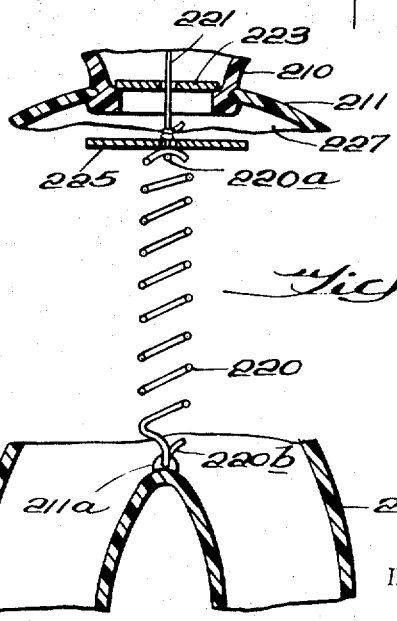
FIG. 5 is a detail in vertical section illustrating another embodiment of another portion of the doll.

In the form of FIG. 5, which may be substituted in FIG. 1, the stored power means comprises a spring-biased means connected to resiliently exert retracting force on the lock of hair 112, shown in the form of a light coil spring 120 having one of its ends 120a attached to the lock of hair by a cord or wire 121, and having its other end 120b supported in the body 111. In this embodiment the coil spring 120 is a conical compression spring having its base 120b supported at the region of joinder of the head 110 and body 111, having its apex 120a extending into the body away from the head, and having the lock of hair attached, by cord 121, to said apex 120a. In this form a single apertured cardboard or plastic sheet assembled on the cord 121 and lying between the base of the spring 120b and the body area 111 serves the purpose of the stop 23 and the arrangement keeps the cord 121 centered and taut at all times.

Figure 6:
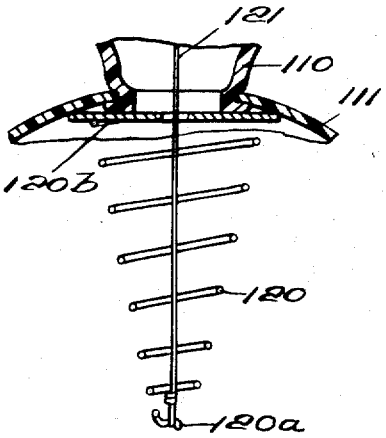
FIG. 6 is a detail in vertical section illustrating a still further embodiment of the latter portion.

In the form of FIG. 6, the resilient retracting means or light coil spring 220 is a tension spring having one end 220b joined to the body 211 in a position remote from the region of joinder of the head 210 to the body 211, as by hooking it to a loop 211a, inside the body say at the crotch area thereof, and having its other end 220a attached to the lock of hair as by the cord or wire 221. An abutment means 225 shown in the form of an apertured cardboard or plastic disc mounted on the cord 221 at the end of the spring 220a abuts the juncture area 227 to limit outward withdrawal of the hair. A second disc 223 serves the same function as the disc 23 in FIG. 1.

In operation: In the form of FIG. 1, the doll is held upright so that the thus stored power of gravity acting on weight 20 will supply the desired power to retract the hair into the doll head when the hair is disengaged from the teeth 30 juxtaposed to the opening 14; while in the forms of FIGS. 5 and 6 it is not necessary to hold the doll vertically as the spring biased power means resiliently exerts its force in any position of the doll.

While there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention.

I claim:

1. A doll, toy figure or the like, including (a) a hollow head and body, (b) a lock of hair arranged in protruding relation through an opening in the head, and (c) means for varying the length of the protruding portion of said lock of hair, and particularly characterized in that (d) said last named means comprises (1) stored power means within said figure for automatically exerting force to retract said lock of hair inwardly through said opening, and (2) retaining means located at said opening for releasable engagement with said lock of hair for resisting retraction thereof by the force of said power means.

2. A figure as claimed in claim 1, said retaining means comprising a series of teeth juxtaposed to said opening and engageable comb-fashion by hair of said [strand] *lock of hair* for preventing retraction thereof.

3. A figure as claimed in claim 1, said retaining means comprising series of comb-like teeth at each side of said opening engageable, respectively, by selected portions of the hair of said [strand] *lock of hair* for preventing retraction thereof.

4. A figure as claimed in claim 2, said series of teeth lying substantially coplanar with the surfaces of the head through which said opening is formed for engaging said hair.

5. A figure as claimed in claim 3, said opening being relatively long and narrow so that securement of a portion of said [strand] *lock of hair* on the teeth at each side of said opening can simulate a parting of the hair.

6. A figure as claimed in claim 1, said stored power means comprising a gravity powered weight movable within said figure between two extreme positions in the first of which [the strand] *said lock* of hair is retracted to the maximum extent and in the second of which [the strand] *said lock* of hair is extended to the maximum extent.

7. A figure as claimed in claim [5] *6*, in which said weight is attached to said [strand] *lock* of hair and is located for movement only within the body of the figure below the head thereof, thereby being prevented from entering said head.

8. A figure as claimed in claim 1, *including* [in which said lock of hair is provided with] stop means inside the head of the figure dimensioned to not allow the lock of hair to pass through *an* [the] opening *which is provided* from said head into said body and *wherein* said stored power means is confined in said body whereby tangling of said hair with said stored power means is avoided.

9. A figure as claimed in claim 1, in which said stored power means comprise a power storing spring connected to exert retracting force on said block of hair.

10. A figure as claimed in claim 1, in which said stored power means consists of a light coil-spring having one of its ends attached to said lock of hair and having its other end supported in said body.

11. A figure as claimed in claim 10, said coil spring being a conical compression spring having its base *supported* [supporting] at the region of joinder of said head and body, having its apex extending into said body away from said head and having said lock of hair attached to said apex.

12. A figure as claimed in claim 10, said coil spring being a tension spring having [one end] *a first one of its ends* joined to the body in a position remote from the region of joinder of said body and head, and having its *remaining* [other] end when stretched, located proximate to said region of joinder.

*13. A doll, toy figure or the like, including*

*(a) a hollow head and body,*

*(b) a lock of hair arranged in protruding relation through an opening in the head, and*

*(c) means for varying the length of the protruding portion of said lock of hair,*

*and particularly characterized in that*

*(d) said last named means comprises*

*(1) stored power means within said figure for automatically exerting force to retract said lock of hair inwardly through said opening, and*

*(2) retaining means for resisting retraction of said lock of hair by the force of said power means.*

*14. A doll, toy figure or the like, including*

*(a) a hollow head and body,*

*(b) a lock of hair arranged in protruding relation through an opening in the head, and*

*(c) means for varying the length of the protruding portion of said lock of hair,*

*and particularly characterized in that*

*(d) said last named means comprises*

*(1) stored power means within said figure for automatically exerting force to retract said lock of hair inwardly through said opening, and*

(2) *retaining means releasably coupled to said power means for resisting retraction of said lock of hair by the force of said power means.*

*15. A doll, toy figure or the like, including*

(*a*) *a hollow head and body,*

(*b*) *a lock of hair arranged in protruding relation through an opening in the head, and*

(*c*) *means for varying the length of the protruding portion of said lock of hair,*

*and particularly characterized in that*

(*d*) *said last named means comprises*

(*1*) *stored power means within said figure for automatically exerting force to retract said lock of hair inwardly through said opening, and*

(*2*) *retaining means releasably coupled to said power means through said lock of hair for resisting retraction thereof by the force of said power means.*

*16. A figure as claimed in claim 15 wherein said retaining means includes means adapted to releasably engage said lock of hair.*

References Cited

The following references, cited by the Examiner; are of second in the patented file of th is patent or the original patent.

UNITED STATES PATENTS

| | | | |
|---|---|---|---|
| 1,498,950 | 6/1924 | Chinn | 46—135 R X |
| 1,557,023 | 10/1925 | Chinn | 46—135 R |
| 2,537,536 | 1/1951 | Lilienstern | 46—172 |
| 3,156,999 | 11/1964 | Dean et al. | 46—172 |
| 3,162,976 | 12/1964 | Beebe et al. | 46—172 |

F. BARRY SHAY, Primary Examiner